United States Patent
Barnes et al.

(10) Patent No.: US 12,084,207 B2
(45) Date of Patent: Sep. 10, 2024

(54) SOLAR SAIL ATTACHMENT AND DEPLOYMENT METHODS

(71) Applicant: L'Garde, Inc.

(72) Inventors: Nathaniel C. Barnes, Irvine, CA (US); Steven C. Widelitz, Riverside, CA (US); Jason White, Tustin, CA (US); Michael Gattulli, Costa Mesa, CA (US)

(73) Assignee: L'Garde, Inc., Tustin, CA (US)

( * ) Notice: Subject to any disclaimer, the term of this patent is extended or adjusted under 35 U.S.C. 154(b) by 291 days.

(21) Appl. No.: 17/453,333

(22) PCT Filed: May 4, 2020

(86) PCT No.: PCT/US2020/031372
§ 371 (c)(1),
(2) Date: Dec. 2, 2021

(87) PCT Pub. No.: WO2020/223733
PCT Pub. Date: Nov. 5, 2020

(65) Prior Publication Data
US 2022/0388694 A1    Dec. 8, 2022

Related U.S. Application Data

(60) Provisional application No. 62/842,369, filed on May 2, 2019.

(51) Int. Cl.
*B64G 1/40* (2006.01)
*B64G 1/22* (2006.01)

(52) U.S. Cl.
CPC ............. *B64G 1/407* (2013.01); *B64G 1/222* (2013.01)

(58) Field of Classification Search
CPC .... B64G 1/222; B64G 1/2221; B64G 1/2222; B64G 1/2223; B64G 1/2224; B64G 1/2225; B64G 1/2226; B64G 1/2227; B64G 1/2228; B64G 1/2229; B64G 1/407
See application file for complete search history.

(56) References Cited

U.S. PATENT DOCUMENTS 6,647,668 B1    11/2003    Choee et al.
8,356,774 B1    1/2013    Banik et al.

FOREIGN PATENT DOCUMENTS

DE    102110082497 A1    3/2013
EP    0524888 A1    1/1993

OTHER PUBLICATIONS

Fu Bo et al: "Solar sail technology—A state of the art review," Progress in Aerospace Sciences, vol. 86, Aug. 3, 2016 (Aug. 3, 2016), pp. 1-19 (abstract).
Extended European Search Report for European Patent Application No. 20798150, dated Dec. 21, 2022, 9 pages.

*Primary Examiner* — Nicholas McFall
(74) *Attorney, Agent, or Firm* — Kari L. Barnes

(57) ABSTRACT

Exemplary embodiments provided herein include an attachment and deployment system and method. Exemplary embodiments may use features together or separately as desired. The attachment feature may be used to periodically couple a solar sail.

14 Claims, 7 Drawing Sheets

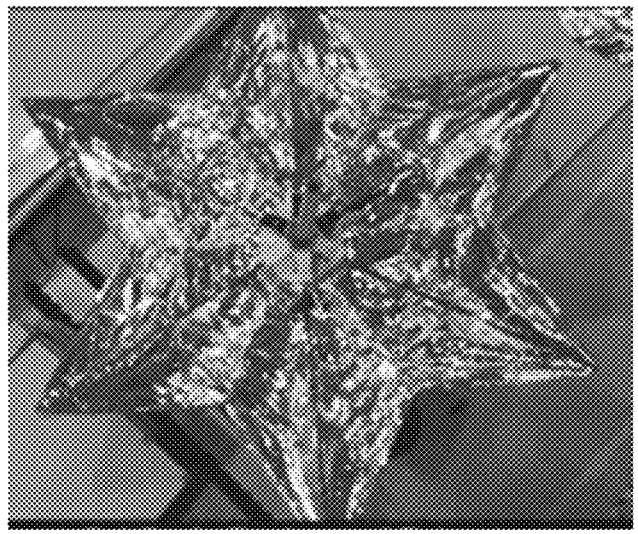
FIG. 8A
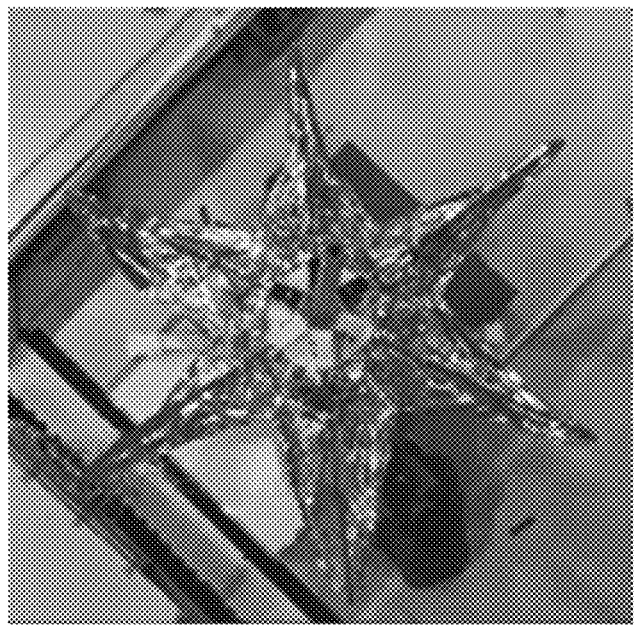
FIG. 8B
FIG. 8C
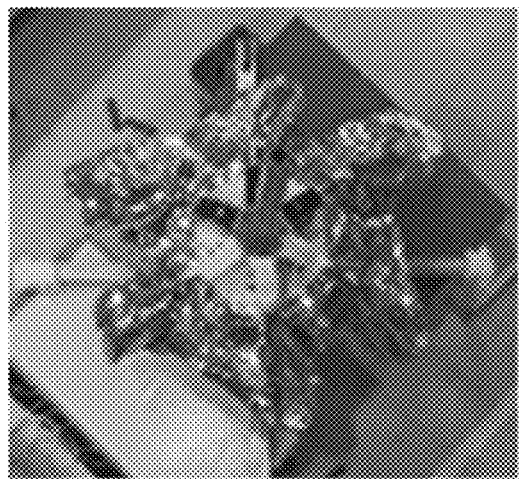

SOLAR SAIL ATTACHMENT AND DEPLOYMENT METHODS

PRIORITY

This application claims priority as a national stage of International Patent Application Number PCT/US2020/031372, filed May 4, 2020, which claims priority to U.S. Provisional Application No. 62/842,369, filed May 2, 2019, each of which is incorporated by reference in its entirety into this application.

BACKGROUND

FIG. 1 illustrates an exemplary solar sail according to conventional system configurations. As illustrated, the solar sail 100 can include a plurality of booms 102 and a plurality of vanes 104. The booms create the support structure and may be deployable structures. Conventionally, the vane 104 is directly attached to a terminal end or near a terminal end of adjacent booms at attachment point 106. The vane is then retained at the center of the solar sail near the hub 108. As seen in FIG. 1, a gap 110 is created along the length of the boom 102 between the hub and the attachment point 106. The attachment point 106 creates a high tension load on the boom pushing on the boom.

SUMMARY

The system and method described includes a spatially-periodic attachment of the material to the support structure as it is deployed or stowed. The attachment methods may be used to provide an initially collapsed structure that is deployable and/or may permit the re-collapse or storage of a deployed configuration.

Exemplary embodiments described herein include period attachment locations along a length of a boom. The periodical attachment locations may be configured to move relative to the boom to permit the deployment of the boom from a stowed configuration to an extended configuration. Exemplary embodiments may be used to reduce the risk of mechanical failure from long column buckling.

This application describes a method of attaching the membrane of a solar sail to its supporting structure. The method described herein is unique in that it allows for multiple deployment and stowage events on station without failure or degradation of the sail performance. As a result, the innovative attachment mechanism enables a more controlled deployment, as determined by the spacecraft controller and operator.

Exemplary embodiments described herein include systems and methods to assist in the controlled deployment and/retraction of a solar sail. Exemplary embodiments may be used during deployment to permit the extension of a boom while controlling the sail attachment and material to control the deployment of the sail. Exemplary embodiments may be used during collapse to restore the sail. The collapse may be controlled to manage the substantial material of the vain as well as the attachment of the sail to the boom.

DRAWINGS

FIGS. 8A-8C illustrate an exemplary deployment to a contracted configuration.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein include a solar sail with novel retraction mechanisms and/or attachment mechanisms. Although embodiments of the invention may be described and illustrated herein in terms of a solar sail, it should be understood that embodiments of this invention are not so limited, but are additionally applicable to other deployable space structures that include attachment between an extendable support structure and another flexible and collapsible structure.

Figure 1:
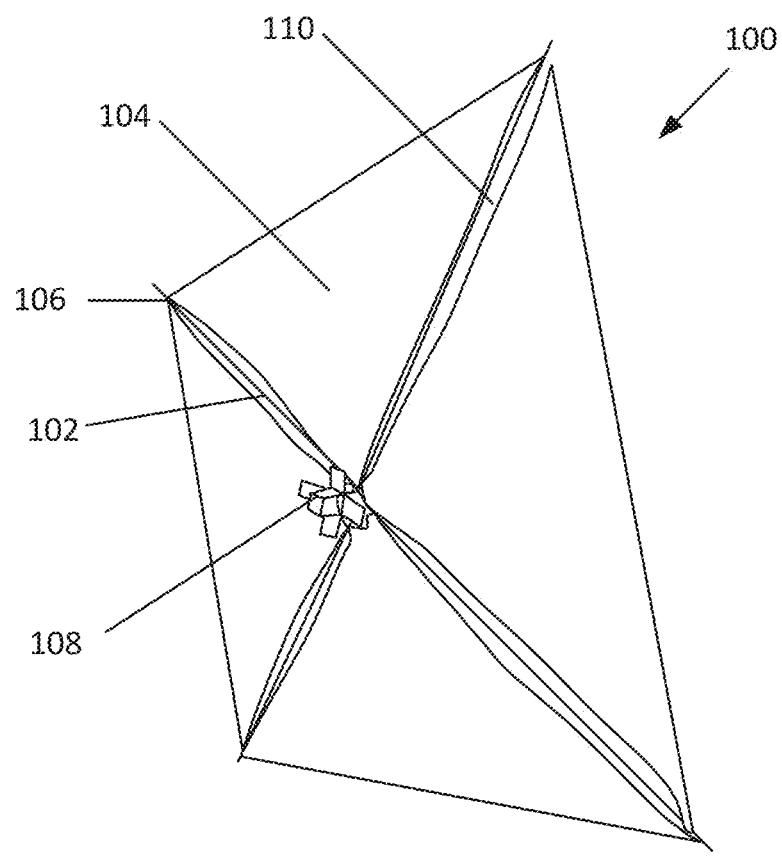
FIG. 1 illustrates and exemplary solar sail.
Figure 2A:
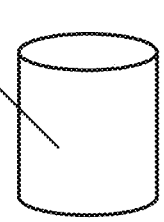
FIGS. 2A-2C illustrate an exemplary solar sail according to embodiments described herein in a stowed configuration, deployed configuration, and partial deployment (either in expanding or retraction).
Figure 2B:
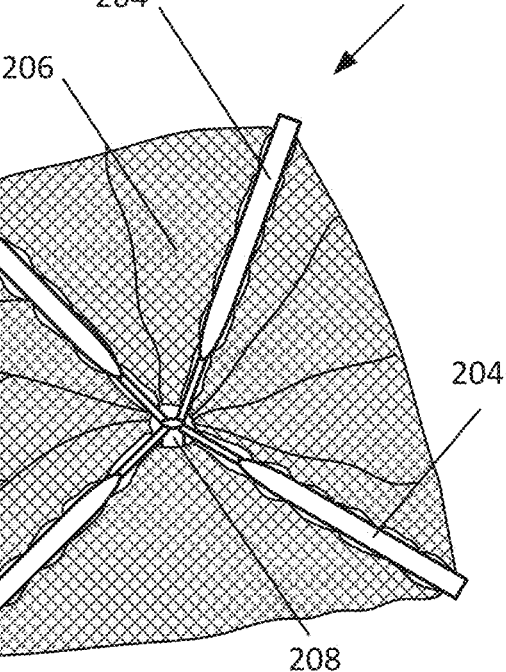

FIGS. 2A-2B illustrate an exemplary solar sail attachment and deployment system and method. The exemplary solar sail 200 is provided in a stowed configuration, illustrated in FIG. 2A and a deployed configuration illustrated in FIG. 2B. The solar sail may be in a stowed configuration and retained within a housing 202. The housing may open and the solar sail expand to the deployed configuration. To transition from the stowed configuration to the deployed configuration, the solar sail may include a plurality of booms 204 that extend outwardly in a desired direction. The solar sail may take advantage of any configuration of boom, such as telescoping, tape spring, inflatable, or otherwise extendable.

As illustrated in FIG. 2B, the exemplary solar sail according to embodiments described herein includes a plurality of booms 204 that support the solar sail vanes 206. As illustrated, the vain is coupled to the boom at a plurality of attachment locations 210 along the length of the boom in the deployed configuration. Also illustrated are a plurality of retraction mechanisms 212 positioned within the sail material in between adjacent booms 204. The retraction mechanisms may be used to control the deployment and contraction of the solar sail according to embodiments described herein. FIG. 2B illustrates examples in which a sail vain may include one, two, or three retraction mechanisms, but any combination of retraction mechanisms may be used.

Figure 2C:
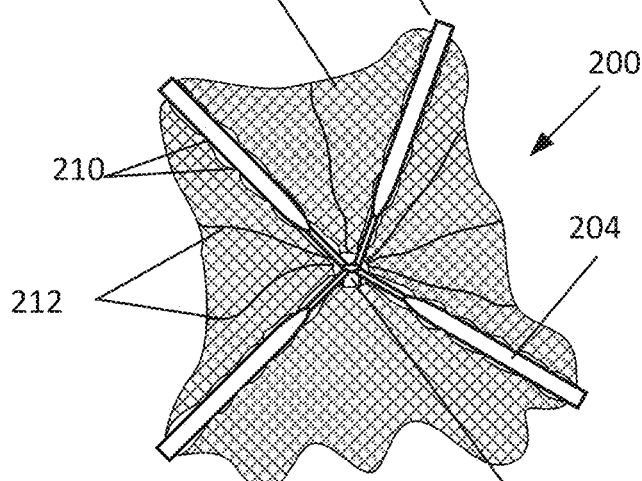

FIG. 2C illustrates an exemplary illustration in the partially deployed or contracted configuration. As represented by the portion of the vain that does not include any retraction mechanism, as the booms retract, the vain slacks and the material of the vain is uncontrolled. The other sections of the vain may control the vain material using the retraction mechanisms. As illustrated, any combination of retraction mechanisms 212 may be used. The retraction mechanism may extend from the hub or center of the solar sail and extend to an outer edge or desired location within the sail vain. The retraction mechanism may attached at or near a terminal edge, outer perimeter of the solar sail vain. The retraction mechanism may also couple periodically to the solar sail within the interior portion of the solar sail. As the solar sail retracts, the retraction mechanisms may be drawn in, which in turn pulls the solar sail vain material toward the hub in a controlled manner. Otherwise, the solar sail vain material may billow or become uncontained and/or uncontrolled. The solar sail vain material is illustrated in a cross hatch pattern for visibility. It is not intended to indicate any select material configuration or substance. The solar sail vain material may be a netting, membrane, reflective material, or any other combination of materials and substances.

This application describes a method of attaching the membrane of a solar sail to its supporting structure. The method described herein is unique in that it allows for multiple deployment and stowage events on station without failure or degradation of the sail performance. As a result, the innovative attachment mechanism enables a more controlled deployment, as determined by the spacecraft controller and operator. Deployment may include both the expansion of the system from a stowed configuration to an in The attachment method can be utilized with any existing space structural deployment systems, including: struts, arms, booms, telescopic boom, foldable boom, rollable boom, trusses, tape springs, hinged booms, shape memory carbon composite hinges with stored energy, inflatable booms, etc. (all of which are referred generally herein as booms for sake of generalization). Exemplary embodiments of the structural supports are capable of tolerating the torsional forces resulting from slewing and pointing a very large area solar sail or other deployable structure.

In an exemplary embodiment, the system may include an actuator for deploying one or more of the support structures. This can be effected by motors driving or pulling the stowed structure from the stowed configuration to the deployed configuration. The actuator and/or driving or pulling mechanism may depend on the support structure configuration. For example, the support structure may include telescoping booms that are deployed using an internal motor-driver lead screw. For example, the support structure may include rolled tape spring that is deployed through a straightening mandrel. For the tape spring configuration of a support structure, the tape spring may be originally in a wound position. The wound tape spring may be positioned on a mandrel or simply rolled upon itself. The actuator may be configured to extend and deploy the support structure and/or retract and stow the support structure.

Figure 3:
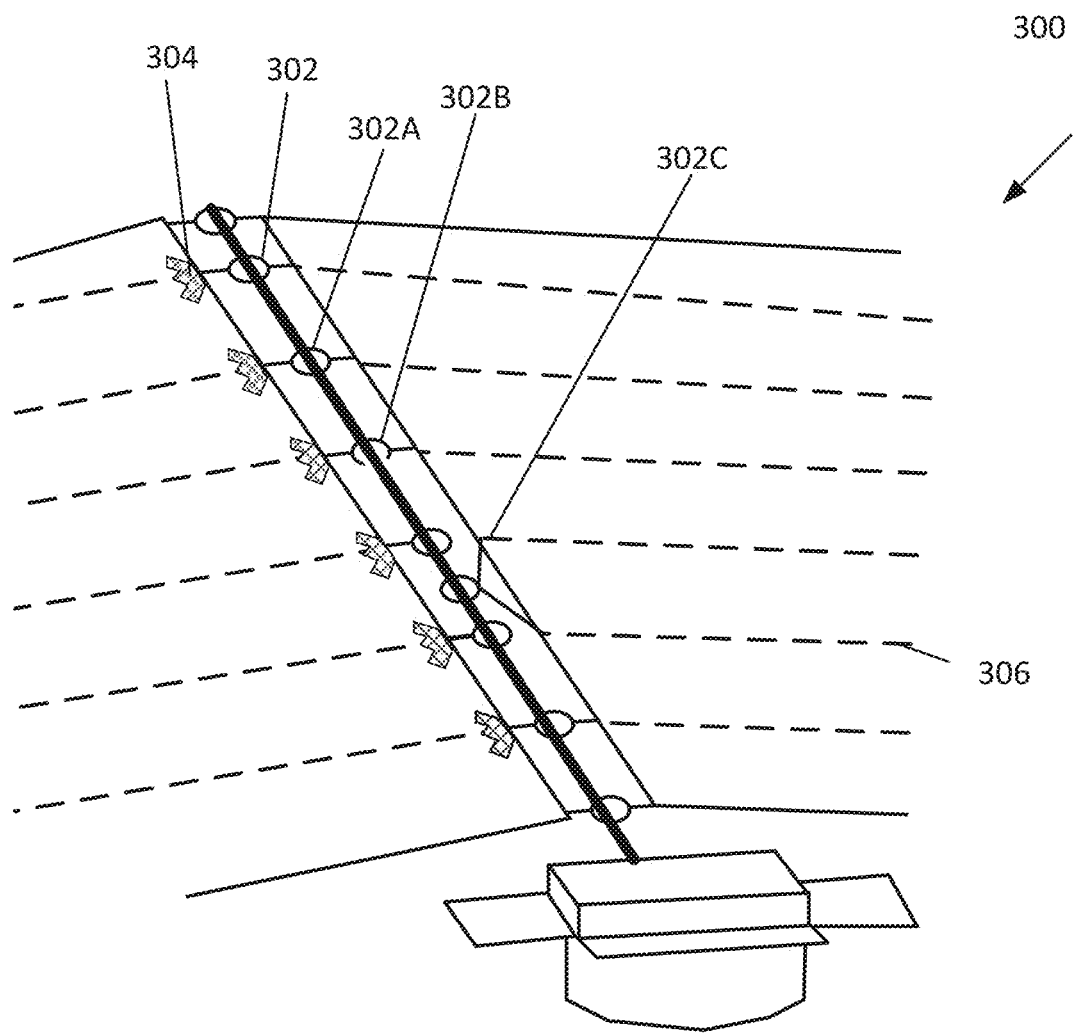
FIGS. 3 and 6 illustrate an exemplary partial view of a solar sail according to embodiments described herein.

FIG. 3 illustrates an exemplary partial view of a solar sail 300 in a deployed configuration. The exemplary solar sail includes different combinations of configurations contemplated by the present disclosure. The configurations may be used individually, or in combination with other features described herein. Any combination of configurations may be used. For example, the same attachment and alignment method may be used for all component parts.

As shown and described herein, exemplary embodiments of a solar sail attachment includes a spatially-periodic attachment to tether between the support structure and the sail. The attachment may be any combination of attachment features that permit the relative movement between the attachment feature and the support structure to permit the sail support structure (boom) to deploy and/or retract.

As illustrated, an exemplary attachment feature 302 a ring that circumscribes a portion or an entire circumference of the support structure. The ring may circumscribe a sufficient portion of the support structure to couple the ring to the support structure such that the ring remains positioned around a portion of the support structure. The ring may permit the longitudinal relative movement of the support structure such that the ring slides along a length of the support structure. As illustrated, the ring 302A may fully circumscribe the support structure. The ring 302B may also only partially circumscribe the support structure. Exemplary embodiments of the ring may include any cross sectional shape. For example, the partial ring may include a longitudinal length to traverse across a side of the support structure and may include two opposing protections that extend around opposing lateral edges of the support structure.

The ring as used here is not restricted to a circular cross section, but may include any full or partial geometric or non-geometric shape traversing across a generally cross sectional outer surface of the support structure. The ring need not be retained or contained in a single plane but may spiral or otherwise wrap around a portion of the support structure. The ring may be in contact or out of contact with the outer surface of the support structure. In an exemplary embodiment, the attachment feature may have a shape that approximates the shape of the support structure in a deployed configuration. The inner diameter of the attachment feature may be approximately equal or just larger than an outer diameter of the support structure in a deployed configuration. In this way, the support structure may move relative to the attachment feature during deployment, but may also provide the desired support and distributive loading after deployment. A person of skill in the art will appreciate an appropriate tolerance to achieve the desired relative movement while maintaining a desired contact between the attachment feature and the supporting structure to distribute the load along the supporting structure. The tolerance may depend on the environment, configuration, or deployment conditions of the solar sail.

The attachment feature 302 may be coupled to the sail in any combination of ways. For example, the attachment feature 302 may be permanently attach to the sail or be secured to the sail such that the attachment position to the sail does not change. The attachment locations may be reinforced such as with reinforcement 304. As illustrated, an attachment tether is secured to the ring which is then secured to the sail material. The sail material may also be directly coupled to the ring. As illustrated, the attachment features 302 may also be positioned relative to reinforcement structures 306 to provide additional support of the sail. The reinforcement structure may be any reinforcement structure, including additional material, stronger material, string, sail layers, etc. The reinforcement may be directly coupled to the attachment location of the attachment feature to the sail or may be separated therefrom. As illustrated, the attachment feature may couple to a sail at one location or at multiple locations. As illustrated in by attachment feature 302C, the same attachment feature may extend and couple to the same sail in multiple locations.

Figure 4:
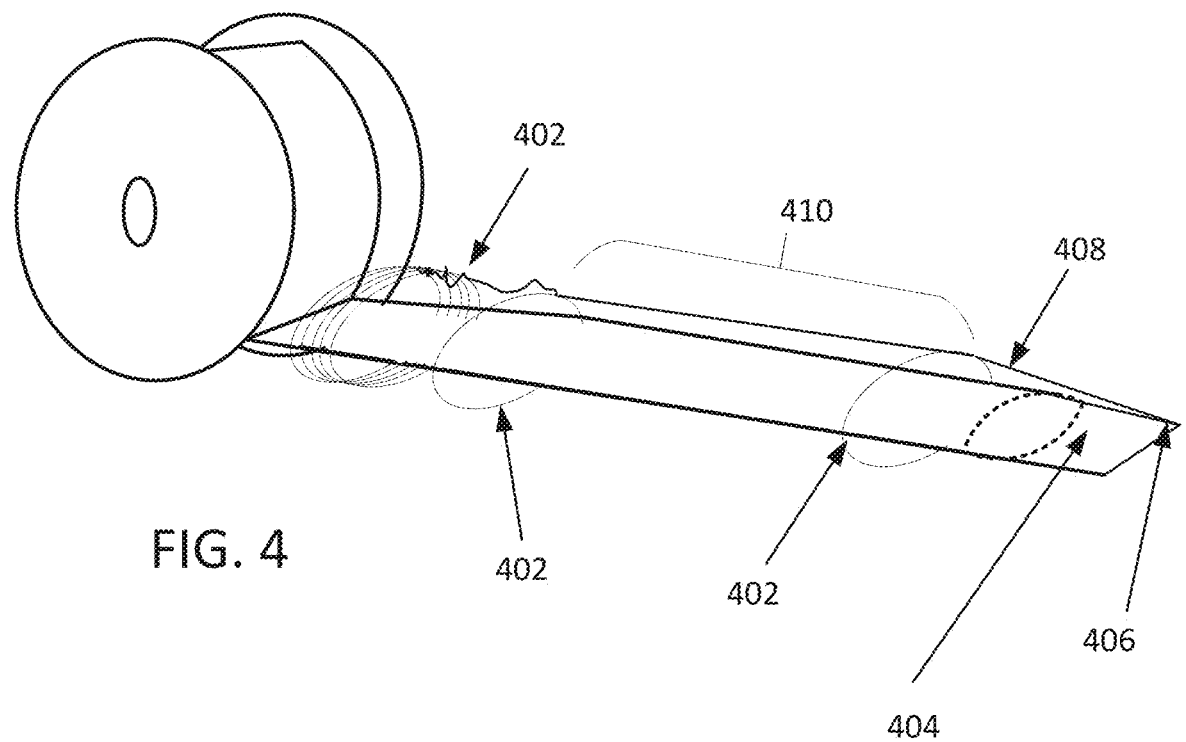
FIGS. 4-5 illustrate exemplary component parts that may be incorporated into embodiments described herein.

FIG. 4 illustrates an exemplary attachment and deployment system and method for deploying the attachment features according to embodiments described herein. A plurality of attachment features 402 may be used along a length of the support structure 404 to tether the sail to the support structure at periodic locations along a length of the deployed support structure.

As illustrated, both the support structure and attachment features may have a collapsed configuration. The attachment features 402 may be positioned proximate each other. The support structure 404 may be configured to extend through an interior of the attachment feature during deployment. At end of the support structure may be directly coupled to a tether 408. The tether may also be coupled between sequential attachment features such that a defined gap 410 is created between attachment points of the tether to sequential attachment features. When the support structure passes through the interior of the attachment feature, the support structure may move relative to the attachment features. The end of the support features moves the tether during deployment, and after a gap length is reached, the tether can pull the next sequential attachment feature.

The Exemplary embodiments described herein may include any combination of mechanisms to position adjacent support structures along the length of the support structure at desired intervals. For example, the position and attachment of the attachment feature to the sail may define a separation distance between adjacent attachment features in a deployed configuration. In this case, the tether 408 may be an edge of the sail. The sail material may then be attached to the support structure at a defined location proximate the end of the support structure. As the support structure deploys, the sail material is pulled by the direct attachment to the support structure at its terminal end. The attachment features will then be sequentially pulled out as the periodic attachment locations are reached during expansion of the support structure.

Other positioning devices may also be used as well or alternatively thereto. For example, a tether may be used coupling adjacent attachment features directly together outside of and separate from the support structure and the solar sail. The support structure may be used in conjunction with the attachment feature to position adjacent attachment features relative to each other. For example, the support structure and attachment feature may include mated features that permit relative motion therebetween for a length of the support structure, but then engaged at desired location to move the support structure and the attachment feature together. For example, an internal dimension of the attachment feature may correspond to an exterior dimension of the support structure, such that the relationship between the dimensions permit sliding along a length and catches (come in contact to reduce further relative movement in at least one direction) at another length or location of the support structure. For example, an outside dimension of the support structure may be variable (either continuous or stepwise or a combination thereof) such as from a taper or projection on an outer surface thereof. The inside diameter of the attachment feature may be larger than a portion of variable outside diameter of the support structure for a first length and may be the same or smaller than the variable outside diameter of the support structure for a second length or location. The relative dimension may be created by an indentation, projection, variable outside circumference, and combinations thereof.

Figure 5:
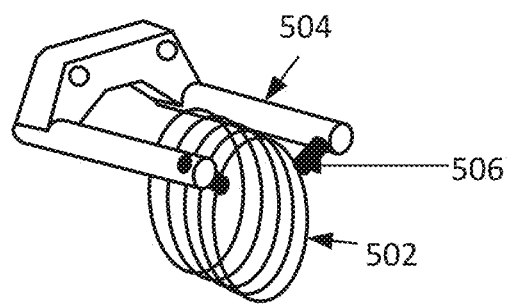

FIG. 5 illustrates an additional deployment feature to control the deployment of the attachment features 502. To retain the attachment features 502 in a desired relative position to the extendable support structure, a retention feature 504 may be used. The retention feature 504 may include an engagement 506 with the attachment feature to keep the attachment features together in a stowed configuration until a desired deployment. In the example illustrated, the engagement 506 is with a deformable extension that retains the attachment features on one side of the engagement until sufficient force is imposed, such as from the pulling by the tether, to deform the engagement and draw out the next sequential attachment feature. In an exemplary embodiment, the engagement may be an extension of a deformable or flexible material. Other frictional engagements may be used.

Exemplary embodiments described herein include a solar sail having a plurality of extendable support structures; and a material coupled between adjacent extendable support structures. The solar sail may also include an attachment feature coupled to the material and coupled to one of the extendable support structures, wherein the attachment feature permits relative movement between the attachment feature and the support structure. The solar sail may also include a plurality of attachment features coupled to one edge of the material and coupled to one of the extendable support structures, wherein the attachment features permit relative movement between each of the attachment features and the one of the extendable support structures. The plurality of attachment features may be coupled to the one edge of the material at periodic intervals along a length of the one edge such that each attachment feature couples to the material at a single location that does not move or permit relative movement at the attachment location.

In an exemplary embodiment, the plurality of attachment features may be rings. The rings may at least partially circumscribe the one of the extendable support structures. Each ring may have an inner dimension that approximates the outer dimension of the one of the support structures.

In an exemplary embodiment, the solar sail may further comprise a reinforcement of the material, and wherein each ring is coupled to the material at a location having a reinforcement.

In an exemplary embodiment, the solar sail further comprises a retention feature to retain the plurality of attachment features in a collapsed configuration until deployment. The solar sail may be configured such that during deployment, sequential attachment features are released from the retention feature. The retention feature may include a deformable projection, or other frictional engagement in which a force is applied to overcome the retention feature and release an attachment feature.

Figure 6:
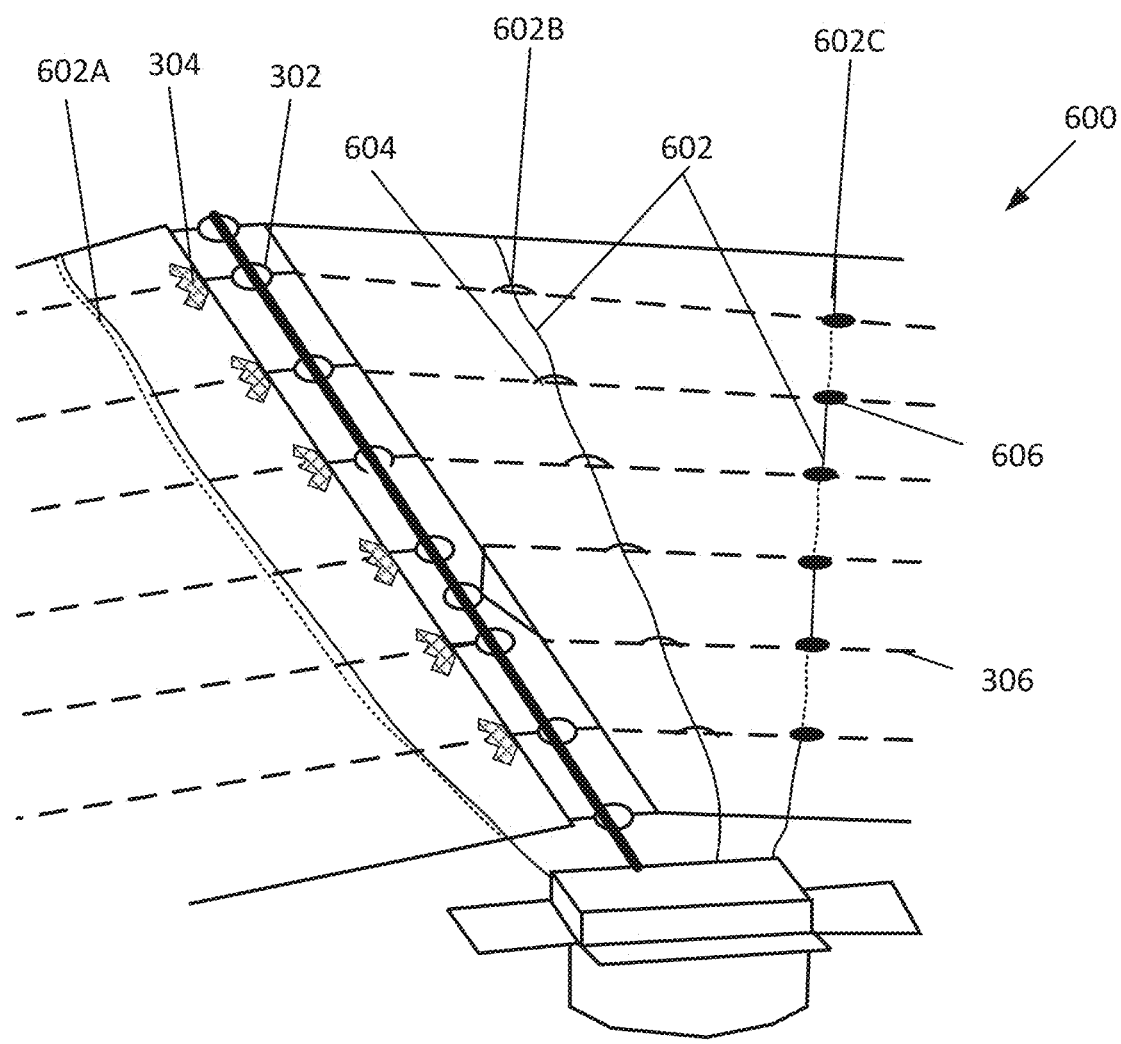

FIG. 6 illustrates an exemplary portion of a solar sail according to embodiments described herein. Exemplary embodiments may include a retraction mechanism to assist in sail material configuration between adjacent support structures. For example, a retraction mechanism may be used to orient and/or position the material between adjacent support structure while the solar sail is in a retracted position and/or when the sail is being retracted and/or deployed. The retraction mechanism may be used to fold, position, retract, deploy, and combinations thereof, the sail material.

As seen in FIG. 6, an exemplary retraction mechanism 602 may be reefing line coupled to the sail material positioned between adjacent support structures. The line may then be coupled at or adjacent to a terminal perimeter edge of the sail material. The line may assist with deployment and/or retraction and/or orientation and/or position of the solar sail. In an exemplary embodiment, the retraction mechanism is coupled proximate the exterior perimeter of the sail between and away from adjacent support structures. The retraction mechanism is configured to retract with the support structures, such that the retraction mechanism pulls and retracts the perimeter edge of the sail material toward the hub during retraction of the support structures. As the support structures retract, slack is formed in the sail material. The retraction mechanism may be used to control the sail material during retraction.

The retraction mechanism 602A may, for example, be a loop that extends around an exterior perimeter of the sail material and back toward the hub on opposing sides of the sail material. As illustrated, the portion of the retraction mechanism 602A obstructed from view by the sail is provided by a dashed line. The retraction mechanism 602B, 602C may, for example, be a tether that extends from the hub to or toward the exterior perimeter of the sail material. The tether may be coupled to the sail material along an entire length or along partial length, such as at discrete and separable positions along the length of the tether. Retraction of the retraction mechanism may therefore pull and position the sail at locations in which the retraction mechanism contacts or attaches to the sail material. The unattached portions of the sail material may therefore be positioned relative to those portions in contact with the sail material. For example, the periodic attachment of the sail material to a tethered retraction mechanism may position the attachment locations adjacent each other, while the unattachment portion of the sail is configured to separate from the tether to define or create a pleating of the material for storage. The configuration of the retraction mechanism may reduce or prevent billowing of the sail material as the support structures are retracted and/or the solar sail is stored or restored.

As illustrated, the retraction mechanism may be coupled to the sail in different ways. For example, the sail may include loops 604 or apertures 606 in which the retraction mechanism may pass. The attachment to the sail may permit relative movement between the sail and the retraction mechanism, such that the retraction mechanism may be permit the deployment of the sail.

Exemplary embodiments described herein include a solar sail having a plurality of extendable support structures; and a material coupled between adjacent extendable support structures. The solar sail may include a retraction mechanism coupled to the material at a position between adjacent extendable support structures. The retraction mechanism may be configured to pull the material to a desired location during retraction of the solar sail.

In an exemplary embodiment, the retraction mechanism may be a line coupled to the material. The line may be coupled to a terminal perimeter edge of the material and/or at a location within an interior of the material. The coupling to the interior of the material may permits relative movement between the material and the retraction mechanism. The coupling to the terminal perimeter edge may define a static attachment location. The coupling is by passing the line of the retraction mechanism through a loop on the material. Other couplings may also be used, such as be passing the line through apertures in the sail material. The solar sail may also include a motor coupled to the retraction mechanism to retract the retraction mechanism and pull the material toward the motor. The retraction mechanism may be configured to extend freely in one direction. The extension may be freely extendable up to a stop, such as at the length or until a length of the retraction mechanism is reached. The motor may be configured to retract the retraction mechanism in a direction opposite the one direction.

Exemplary embodiments described herein may use different methods and devices to control the retraction mechanism. In an exemplary embodiment, the retraction mechanism includes a line. The retraction mechanism may be coupled to a spool that may be actuated and spun by a motor. The motor may therefore be used to spin the spool and wind the line, thereby shortening its length. The attachment of the line to a portion of the solar sail may then pull the solar sail toward the hub. The retraction mechanism may also include a release, such that the motor controls the rotation of the spool in a first direction, but the release permits the free rotation in the opposite direction. In this way, the spool may be released during deployment, such that the tension of the solar sail may unwind the line and turn the spool to deploy the solar sail. To then retract the solar sail, the motor may be engaged and spin the spool to wind and retract the line, thereby also retracting the solar sail.

Illustrates an exemplary solar sail according to embodiments described herein, in which the sail is in a stored configuration. The solar sail is contained within a housing that is configured to open upon deployment. The housing contains the sail material, support structures, attachment mechanism, and actuators according to embodiments described herein.

Exemplary embodiments include a solar sail having a plurality of support structures that are configured to deploy from a retracted configuration to an extended configuration. Four and six support structures are illustrated herein, but any combination of support structures may be used. The solar sail includes a sail material extending between and supported by the support structures. The solar sail is coupled to the support structures through an attachment feature. The attachment feature may permit relative movement between the attachment feature and the support structure during deployment. When fully deployed the attachment feature(s) may permit period attachment of the solar sail to the support structure along a length of the support structure. The length may be an entire length, or a substantial length (more than 75%) of the length of the support structure. Exemplary embodiments may result in solar sail coupled between the support structure at periodic attachment location that are moveable along a length of the support structure.

Figure 7A:
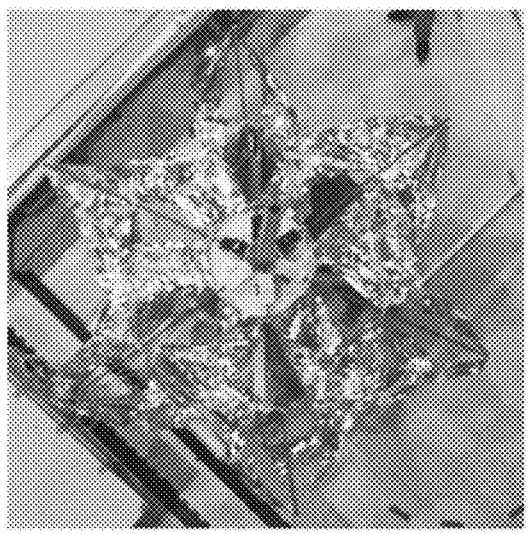
FIGS. 7A-7C illustrate an exemplary deployment to a deployed configuration.
Figure 7B:
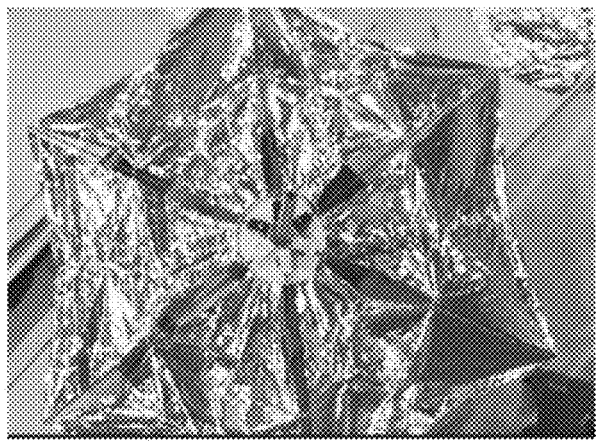
Figure 7C:
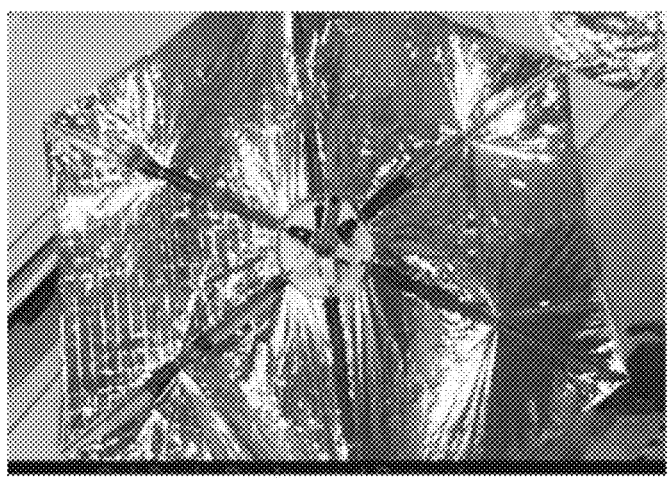

FIGS. 7A-7C illustrate an exemplary sequential images representing a deployment of a solar sail according to embodiments described herein. As illustrated, FIG. 7A is a partial deployment with the booms beginning to extend from a hub. As can be seen, the sail is periodically attached to a boom. The space between attachment locations is visible as the material is still in a partially folded configuration. FIG. 7B is in a more fully deployed, but still transitional configuration. FIG. 7C illustrates an exemplary solar sail in a fully deployed configuration. As can be seen, the sail is retained next to the plurality of booms after deployment. The sail deformation also illustrates the additional supporting forces distributed throughout the sail, reducing the localized load at the terminal end of the boom and sail.

FIGS. 8A-8C illustrate the retraction of an exemplary solar sail according to embodiments described herein. As illustrated in FIGS. 8A-8B, as the booms retract, the sail cross section is reduced. The retraction mechanisms are used to pull in sail material toward the center of the solar sail to control the sail material during retraction. During retraction, the sail may form a star like profile as the sail material is positioned by the retraction mechanism. When fully retracted, as seen in FIG. 8C, the solar sail is in a controlled and compact configuration.

Exemplary embodiments use a retraction mechanism to pull the sail material between adjacent support structures toward the hub during retraction such that the sail material is retains at a distance closer to the hub than the terminal end of the support structure to reduce billowing.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include certain features, elements and/or states. However, such language also includes embodiments in which the feature, element or state is not present as well. Thus, such conditional language is not generally intended to imply that features, elements and/or states are in any way required for one or more embodiments or that one or more embodiments necessarily exclude components not described by another embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

The invention claimed is:

1. A solar sail, comprising:
a plurality of extendable support structures;
a material coupled between adjacent extendable support structures; and
a retraction mechanism comprising a line coupled to the material at a terminal perimeter edge of the material and at a location within an interior of the material between adjacent extendable support structures, wherein the retraction mechanism is configured to pull the material to a desired location during retraction of the sail.

2. The solar sail of claim 1, further comprising an attachment feature coupled to the material and coupled to one of the extendable support structures, wherein the attachment feature permits relative movement between the attachment feature and the extendable support structure.

3. The solar sail of claim 1, further comprising a plurality of attachment features coupled to one edge of the material and coupled to one of the extendable support structures, wherein the attachment features permit relative movement between each of the attachment features and the one of the extendable support structures.

4. The solar sail of claim 3, wherein the plurality of attachment features are coupled to the one edge of the material at periodic intervals along a length of the one edge such that the attachment feature couples to the material at a single location that does not move.

5. The solar sail of claim 4, wherein the plurality of attachment features comprises rings.

6. The solar sail of claim 5, wherein the rings at least partially circumscribe the one of the extendable support structures.

7. The solar sail of claim 6, wherein each ring has an inner dimension that approximates the outer dimension of the one of the extendable support structures.

8. The solar sail of claim 7, further comprising reinforcement of the material, and wherein each ring is coupled to the material at a location having a reinforcement.

9. The solar sail of claim 7, further comprising a retraction mechanism coupled to the material at a position between adjacent extendable support structures.

10. The solar sail of claim 1, wherein a coupling between the retraction mechanism to the interior of the material permits relative movement between the material and the retraction mechanism.

11. The solar sail of claim 10, wherein the coupling is by passing the line of the retraction mechanism through a loop on the material.

12. The solar sail of claim 10, further comprising a motor to retract the retraction mechanism to pull the material toward the motor.

13. The solar sail of claim 10, wherein the retraction mechanism is configured to extend freely in one direction.

14. The solar sail of claim 13, further comprising a motor to retract the retraction mechanism in a direction opposite the one direction.

\* \* \* \* \*